July 18, 1961 B. A. BUSS Re. 25,009

LAUNDRY FOLDING MACHINE LANE CONTROL MEANS

Original Filed Nov. 19, 1956 2 Sheets-Sheet 1

INVENTOR
BENJAMIN ALVIN BUSS
BY
Robertson and Smythe
ATTORNEYS

LAUNDRY FOLDING MACHINE LANE CONTROL MEANS

Original Filed Nov. 19, 1956 2 Sheets-Sheet 2

INVENTOR
BENJAMIN ALVIN BUSS
BY
Robertson and Sayles
ATTORNEYS

United States Patent Office

Re. 25,009
Reissued July 18, 1961

25,009
LAUNDRY FOLDING MACHINE LANE CONTROL MEANS

Benjamin Alvin Buss, East Moline, Ill., assignor to American Machine and Metals, Inc., East Moline, Ill., a corporation of Illinois Original No. 2,924,451, dated Feb. 9, 1960, Ser. No. 623,143, Nov. 19, 1956. Application for reissue Jan. 13, 1961, Ser. No. 82,664
4 Claims. (Cl. 270—69)

Matter enclosed in heavy brackets [ ] appears in the original patent but forms no part of this reissue specification; matter printed in italics indicates the additions made by reissue.

This invention relates to a control arrangement for folding machines having a plurality of folding lanes such as machines used to fold bedsheets and the like, and more particularly to a control system wherein the number and arrangement of lanes can be selected.

It often is desired to perform a series of timed or spaced folding operations upon articles which are successively fed into processing equipment of various sorts. For example, in commercial laundries the pieces of laundry, such as bedsheets, are washed, ironed and folded by automatically operating machines. The automatic sheet folding apparatus may employ a control system arranged to insure that the successive folding operations will be performed at selected proportionately spaced points on each sheet regardless of the length thereof. These machines frequently have a plurality of lanes so that sheets or articles of varying widths can be processed, narrow sheets or articles being foldable by the use of a single lane. Thus, a plurality of narrow articles can be processed at the same time. Also it is desired in some instances to vary the number of folds made in sheets run through the folding machine.

One of the objects of this invention is to provide an improved control system for article processing apparatus which can be operated selectively to vary the lane arrangement in a folding machine.

A further object of this invention is a control system which is suitable for use with sheet folding apparatus employing folding devices of the pneumatic type and wherein the number of lanes and folds to be made in a sheet can be selected in a simple manner.

The invention will be described in conjunction with a folding machine which can receive ironed sheets from an ironing machine and convey the sheets over conventional conveyor means or belts past the various folding stations of the folding machine. Suitable measuring and timing arrangements are employed for selecting and setting timing means and activating the folding mechanism in accordance with the length of each sheet to be folded. One such selecting and timing mechanism is illustrated in copending application Serial No. 545,872, filed November 9, 1955, now U.S. Patent No. 2,858,129, and another is seen in Patent 2,652,246. Also, a mechanism is shown in copending application Serial No. 579,947, filed April 23, 1956, now U.S. Patent No. 2,852,251, for selecting the number of folds to be made. The sheets to be folded are carried by a belt conveyor means, moved past a measuring finger in each lane and then moved downwardly to a first folding station in front of a folding arrangement for the lane, said folding arrangement preferably being in the form of a pneumatic blast folding device. The pneumatic blast means can be activated by the timing means so that at the proper time, a blast of air will be directed on the sheet to move a line of said sheet sidewise into contact with a pair of rotating folding rollers or roll means, the rollers engaging the sheet and drawing it therebetween to make a fold. The once folded sheet then can be carried by a conveyor means to a position in front of a second station having a similar pneumatic blast apparatus for the lane. The second pneumatic blast apparatus is arranged to be activated by the timing mechanism at a predetermined time if a second fold is to be made in the sheet. Upon activation, a line of the sheet properly spaced from the ends will be carried between two rotating folding rollers to provide the second fold in the sheet. In one form, the mechanism can be set to make only one fold. At least three lanes are used, two of which can be called the master lanes. Each of the lanes has a measuring device and activating means for the sheet folding devices for the lane involved. When processing narrow articles, each lane can function to fold an article fed thereto. Switching means are provided to connect a lane folding device to an adjacent lane measuring arrangement and disabling the measuring device of the lane involved so that one measuring finger will actuate both lanes or the lanes so connected. Either master lane can have its measuring finger and apparatus employed to activate all of the folders simultaneously. When a wide piece is being folded, it is desirable that the plurality of folding devices across the machine be simultaneously activated.

These and other objects, advantages and features of the invention will become apparent from the following description and drawings.

In the drawings:

FIGS. 1a and 1b show a schematic wiring diagram of the folding and timing apparatus.

Reference may be made to the aforementioned copending applications for details of the measuring and folding devices, it being understood that other arrangements can be used.

Figure 1A:
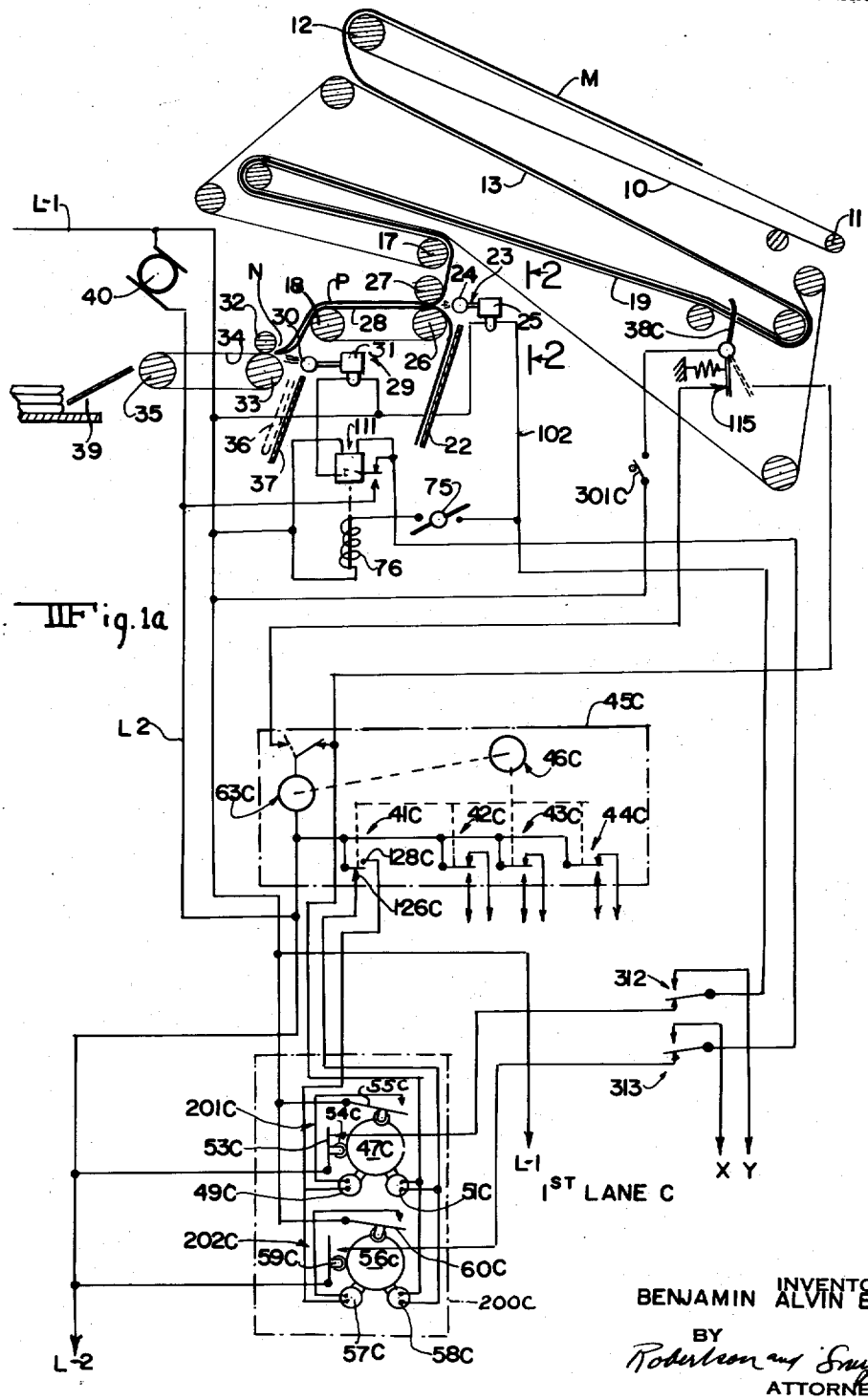
Figure 2:
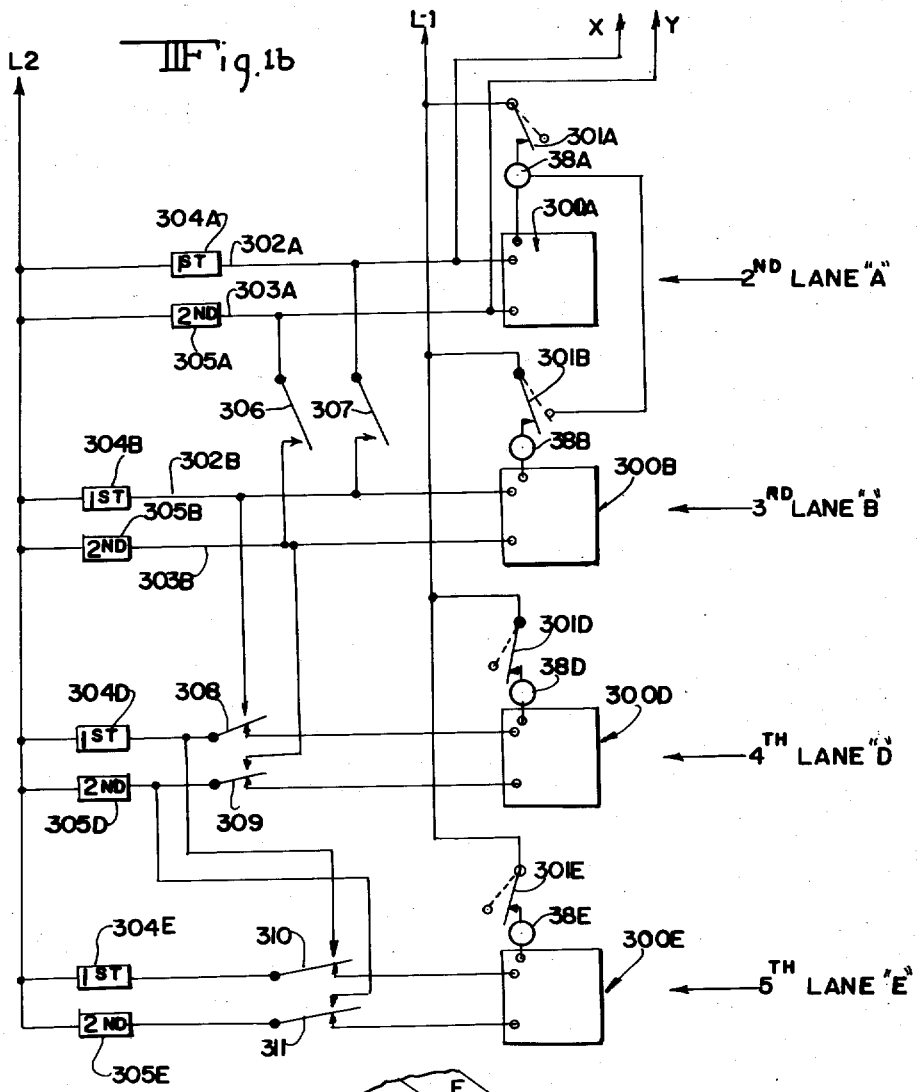
FIG. 2 is a schematic fragmentary view of the pneumatic folding apparatus.
Figure 2:
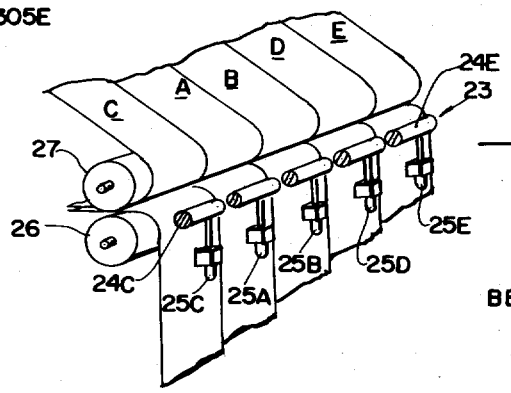

In FIG. 1a, sheet [A] *M* is illustrated on endless conveyor ribbon belt means 10, said belt means passing around spaced rollers 11 and 12, sheet [A] *M* passing onto belt 13. Endless belt means 19 cooperating with belt means 13 is arranged to receive sheet A so that it will be gripped between said belts 13 and 19 and carried along on its path. As the sheet passes over roll 17, it will be directed downwardly, its lower edge being guided by deflector shield 22, the sheet [C] *P* passing in front of the first folding station. In the form shown herein, five lanes, lettered A to E inclusive, are contemplated such as seen in FIG. 2. A and B can be considered to be the master lanes. A separate folding apparatus with its related valve 25 is provided for each lane. Mechanical folders also could be used although pneumatic ones are preferred.

Each folding station may comprise a pneumatic blast arrangement including a manifold or pipe 24 extending across each of the lanes, air thereto being controlled by a suitable solenoid operated valve 25 for each pipe, the valve being opened by a signal from the timing mechanism for the lane, as will be described at a later point. The operating elements for each lane are given appropriate letters in addition to the numerals so as to indicate the lane concerned.

When the sheet reaches a correct position in front of the air blast for a lane as determined by the measuring and timing apparatus, the particular air blast solenoid is energized so as to blow and move a center portion of the sheet between the first folding rolls 26 and 27. Belt 28 means is guided by the first folding rollers 26 and 27. The sheet will be drawn between the first folding rolls 26 and 18 and carried as indicated onto belt 28.

The folded edge [B] *N* of sheet [C] *P* then will be moved on belt 28 so as to pass downwardly over roll 18 and in front of the second folding apparatus 29 for each lane. Each of the second folding apparatus preferably comprises an air blast manifold or pipe 30 for each lane and solenoid 31 operable to control the flow of air from pipe 30 in a manner similar to the first folding station. The second folding rolls 32, 33 are arranged suitably in front of the second folding station 29. Belt 34 means is guided by roll 33 and roll 35.

If a second fold is to be made in the sheet, the once folded edge [B] *N* of sheet [C] *P* will move downwardly as indicated in dotted lines 36 and be guided by the second fold station shield or guide 37. At an appropriate time and in proportion to the length of the sheet, the air blast folder 29 will be activated so as to cause the desired portion of the sheet or article to move sidewise into gripping relationship between folding rolls 32 and 33.

Each of the air blast solenoids 25 and 31 will be actuated at appropriate times in accordance with the timing mechanism as governed by the sheet measuring switch or sensing finger 38 for the lane, a measuring finger and related apparatus being provided for each lane. In the event that only a single fold is to be made, air blast 29 is activated by the timing mechanism so that the leading edge [B]*N* of sheet [C]*P* receives a blast of air before or as it reaches folding rolls 32, 33 so that the leading folded edge B will be drawn directly between the side rolls and carried to collecting station 39.

The various rolls and belts are driven in a suitable manner by a constant speed motor 40, which can be connected to line L1 and line L2. The motor may be a synchronous motor or any other arrangement to produce a constant speed.

Normally, a plurality of timing and selecting means will be used for each lane, such as shown in said Serial No. 545,872, but it is to be understood that other types of selecting and timing mechanisms can be employed, such as, for example, as shown in Patent No. 2,652,246.

In order to control successive operations of folding mechanisms 23 and 29 and to provide the successive timed blasts of air for a lane when a plurality of sheets, one following the other pass through the machine, a plurality of timing mechanisms similar to the one illustrated at 200C can be provided as needed, such being described in detail in said copending applications Serial Nos. 312,834 or 545,872, each of the timing mechanisms consisting of a plurality of subtiming devices for operating the folding means for the lane. One set of timing means is provided for each of the folding means used.

By way of example, timing device 200C may have subtiming mechanisms 201C, 202C, subtiming mechanism 201C operating the first pneumatic blast folding mechanism for lane C and subtiming means 202C operating the second pneumatic blast timing mechanism at the desired time.

Each of the subtiming devices 201C and 202C in the timing mechanism 200C is controlled by the measuring switch means 38C and motor switch means 41C, other selector switches 42C, 43C, 44C being provided as indicated in block 45C, said selector switches being operated for activating other timing mechanisms for the lane, for example, by a cam means schematically shown at 46C. Subtiming device 201C controlling air blast means 23 for the lane may be composed of a cam [47] *47C* driven by high speed motor 49C, of the constant speed type through an overrunning clutch means while low speed motor 51C also is adapted to drive cam 47C through an overrunning clutch means. Thus, cam [47] *47C* can be driven by either of motors 49C or 51C, the slow speed motor driving the cam as a sheet is passing the measuring finger.

Switch 53C is placed at a predetermined location relative to its cam and serves to operate the first station air blast means 23 when the indentation on the cam is engaged by follower 54C of switch 53C. The other subtiming device 202C controls operation of the second air blast folding means 29 for the lane, and can be composed of cam 56C and motors 57C and 58C corresponding to similar elements in device 201C, motors 57C and 58C having overrunning clutches to permit rotation of cam 56 by either of said motors. Switch 59C with its associated follower serves to control energization of air blast folding means 29. The speeds of the drive motor 40 and high speed motor 49C are so related that a sheet between conveyor belts 13 and 19 would have its trailing edge folding point positioned adjacent the point at which folding means 31 is operated when cam 47 has completed a predetermined portion of a revolution. The speed of low speed motor 51C is related to the speed of high speed motor 49C in such a manner as to permit cam 47C to actuate switch 53C at a time when the proportionately spaced fold point of the sheet on the conveyor belt passes folding means 23 for the lane. The speeds of motors of subtiming device 202 are similarly related to each other and to the speed of drive motor 40, so that comparable operation is effected for folding means 29 for the lane.

Assuming initially that only timing mechanism 200C is operated, it can be seen that both low speed motors 51C and 58C will be energized when the leading edge of the sheet engages the measuring switch 38C for the lane, there being a measuring finger for each lane. As soon as cams 47C and 56C start to rotate, the notches therein are moved out of engagement with the followers of switches 55C and 60C, thus closing both of said switches. High speed motors 49C and 57C are not energized at this time, however, since the movable member of cam actuated switch 41C is connected to contact 126C rather than contact 128C. Cams 47C and 56C continue to rotate at their low speeds until the trailing edge of the sheet passes the article engaging portion of measuring switch 38C, at which time movable member moves into engagement with contact 115. At this point, cam actuated switch 41C is operated by the sequence controller 45, as described in Serial No. 545,872 to connect the movable member of 41C with contact 128C and thus energize the high speed motors 49C and 57C. When the high speed motors 49C and 57C are energized, cams 47C and 56C are rotated at high speeds until the followers of switches 53C and 59C are engaged by the notches in the cams to operate folding means 23 and 29 at their correct times. Thus, it is evident that timing mechanism 200C operates in conjunction with measuring means 38 to selectively control the operation of folding means 23 and 29.

The sequence switch motor 63C is suitably connected across the supply lines and operates to choose the next timer (not shown) for measuring for the next sheet in the lane.

In the event it is desired to produce only a single fold, switch 75 can be closed so as to complete a circuit between line 102 and line L–1 through solenoid 76 of the mechanical latch type relay 111. Such will cause only the first folding arrangement to be effective in folding a sheet, the second blast also being actuated to feed the folded edge of the sheet directly into the folding rollers.

Each of the schematic boxes 300A, 300B, 300D, 300E, [contain] *contains* a sequence switch arrangement similar to that described for box 45C and for timing mechanism 200C. Each has a measuring switch 38A, 38B, 38D, and 38E, respectively, associated therewith and operable in a manner similar to that described for 38C. Each of the measuring switches is connected to line L–1 through a switch as follows: 301C for lane C, 301A for lane A, 301B for lane B, 301D for lane D, and 301E for lane E. First and second folding solenoids for operating the various folding mechanisms of the respective lanes are connected in lines 302, 303, for each (a suitable suffix indicating the lane). For lane A, the first folding solenoid is indicated at 304A and the second at 305A.

With the switches arranged as shown in FIGS. 1a and 1b, each of the lanes is separably operable by its measuring switch and folding means. If it is desired to connect lanes A and B together with the measuring finger for lane A performing the measuring, then switch 301B will be opened, and switches 306 and 307 closed. As a result thereof, when measuring switch 38A is activated by an article passing over the switch on the conveyor, an impulse or the activating energy will be fed to line 302A from the timing and measuring apparatus 300A, the impulse or energy also being fed through closed switch 307 to line 302B and the first folding solenoid 304B of lane B. Similarly, the second impulse or energy for the second folding operation will be fed to line 303A and line 303B from 303A through closed switch 306. Opening of switch 301B will disable timing mechanism 300B and permit 300A to operate both lanes A and B simultaneously. In a similar manner, lane D can be connected to be operated by lane B by moving switches 308 and 309 upwardly, switch 301D being opened. It should be apparent that lane D can be operated then by either measuring finger 38A or 38B. If it is desired to connect lane E with the next adjacent lane, or in turn to lanes A and/or B, then switches 310 and 311 are moved to their upper position so that an impulse will be received from their next operative lane. Similarly lane C can be connected to its adjacent master lane A by shifting switches 312 and 313 from their lower position to their upper position. Thus, any combination of adjacent lanes selectively can be connected together and either of the master lanes used to operate all of the folding controls.

It should be apparent that details of construction can be varied without departing from the spirit of the invention except as defined in the appended claims.

What is claimed is:

1. In a textile sheet folding machine, the combination including conveying means for moving sheets therethrough, said conveying means having at least three lanes thereacross for receiving sheets of varying widths and lengths, two of which lanes are the master lanes, electrically operated sheet timing and measuring means for each lane, each being actuatable by a sheet being conveyed in the lane, folding means for each lane, means for connecting each of said timing and measuring means with its respective lane folding means, switching means for the sheet timing and measuring means of the two master lanes for preselecting alternatively one or the other of said master lanes timing and measuring means to activate one of the sheet timing and measuring means of one of said master lanes for controlling said folding means of both of said master lanes and for disabling the timing and measuring means for the other master lane, and switching means preselectively connecting the folding means for said other lane with either of the timing and measuring means of said master lanes and disabling the timing and measuring means for said other lane, so that said other lane folding means can be operated individually for narrow sheets, or said other lane can be operated with an adjacent master lane.

2. In a textile sheet folding machine, the combination including conveying means for moving sheets therethrough, said conveying means having at least three lanes thereacross for receiving sheets of varying widths and lengths, two of which lanes are the master lanes, electrically operated sheet timing and measuring means for each lane, each being actuatable by a sheet being conveyed in the lane, a pair of folding means for each lane for producing two folds in each sheet in a lane, means for connecting each of said timing and measuring means with its respective lane folding means, switching means for the sheet timing and measuring means of the two master lanes for preselecting alternatively one or the other of said master lanes timing and measuring means to activate one of the sheet timing and measuring means of one of said master lanes for controlling said folding means of both of said master lanes and for disabling the timing and measuring means for the other master lane, switching means preselectively connecting the folding means for said other lane with either of the timing and measuring means of said master lanes and disabling the timing and measuring means for said other lane, so that said other lane folding means can be operated individually for narrow sheets, or said other lane can be operated with an adjacent master lane, and means for preselectively activating one or two of said folding means in a lane.

3. In a textile sheet folding machine, the combination including conveying means for moving sheets therethrough, said conveying means having at least three lanes thereacross for receiving sheets of varying widths and lengths, two of which lanes are the master lanes, electrically operated sheet timing and measuring means for each lane, each being actuatable by a sheet being conveyed in the lane, a pair of pneumatic blast folding means for each lane for producing two folds in each sheet in a lane, means for connecting each of said timing and measuring means with its respective lane folding means, switching means for the sheet timing and measuring means of the two master lanes for preselecting alternatively one or the other of said master lanes timing and measuring means to activate one of the sheet timing and measuring means of one of said master lanes for controlling said folding means of both of said master lanes and for disabling the timing and measuring means for the other master lane, switching means preselectively connecting the folding means for said other lane with either of the timing and measuring means of said master lanes and disabling the timing and measuring means for said other lane, so that said other lane folding means can be operated individually for narrow sheets, or said other lane can be operated with an adjacent master lane, and means for preselectively activating one or two of said folding means in a lane.

4. In a textile sheet folding machine, the combination including conveying means for moving sheets therethrough, said conveying means having at least three lanes thereacross for receiving sheets of varying widths and lengths, two of which lanes are the master lanes, electrically operated sheet timing and measuring means for each lane, each being actuatable by a sheet being conveyed in the lane and producing signals, folding means for each lane operable by said signals, means for connecting each of said timing and measuring means with the operators for the respective lane folding means so said signals will operate the same, switching means for the sheet timing and measuring means of the two master lanes for preselecting alternatively one or the other of said master lanes timing and measuring means to activate sheet timing and measuring means thereof of one of said master lanes and feeding signals to the folding means of both of said master lanes to operate both thereof and for disabling the timing and measuring means for the other master lane, and switching means preselectively connecting the folding means for said other lane with either of the timing and measuring means of said master lanes so that the signals therefrom will actuate the same therewith and disabling the timing and measuring means for said other lane, so that said other lane folding means can be operated individually for narrow sheets, or said other lane can be operated with an adjacent master lane.

References Cited in the file of this patent or the original patent

UNITED STATES PATENTS

| | | |
|---|---|---|
| 1,519,733 | Kohn | Dec. 16, 1924 |
| 2,158,896 | Charles et al. | May 16, 1939 |
| 2,275,964 | Johnson | Mar. 10, 1942 |
| 2,743,921 | Spreckelmeier | May 1, 1956 |